Patented July 3, 1951

2,559,330

UNITED STATES PATENT OFFICE 2,559,330

DYESTUFFS OF THE ANTHRAQUINONE SERIES

Samuel von Allmen, Ernst Gutzwiller, and Jacques Günthart, Basel, Switzerland, assignors to Sandoz, A. G., Basel, Switzerland, a Swiss firm No Drawing. Application January 9, 1950, Serial No. 137,674. In Switzerland February 17, 1949

8 Claims. (Cl. 260—374)

The present invention relates to new dyestuffs of the anthraquinone series, and to the manufacture thereof.

It is a desideratum of anthraquinone dyestuffs that they be characterized by as high as possible a power of exhaustion from neutral baths, particularly when employed in the dyeing of wool, nylon and loaded or unloaded silk.

A primary object of the present invention is the embodiment of anthraquinone dyestuffs which are characterized, relative to comparable known dyestuffs, by an appreciably better power of exhaustion from neutral baths.

The aforesaid desideratum and object, as well as other objects and advantages, are realized according to the present invention by causing a 4-amino-4'-halogeno-diphenylether to react with an anthraquinone compound which contains reactive substituents in the 1-position and in one of the 4-, 5-, and 8-positions, or with a mixture of such anthraquinone compounds, and then sulphonating the condensation products so obtained. Dyestuffs which are substituted in the 1.5- and 1.8-positions of the anthraquinone nucleus dye wool, nylon and loaded or unloaded silk in red to blue-violet shades. Dyestuffs substituted in the 1.4-positions give green shades on these textiles. The new dyestuffs are characterized, compared with comparable known dyestuffs, such for example as those prepared according to German Patent 717,073 and Swiss Patents Nos. 196,655 and 199,660–199,664, inclusive, by an appreciably better power of exhaustion from neutral baths.

Suitable anthraquinone compounds which can be used for the reaction according to the invention are for example: 1.4-, 1.5- and 1.8-dihalogenanthraquinones, 1.5- or 1.8-dinitroanthraquinones, 1.4-, 1.5- and 1.8-nitrocloranthraquinones and 1.4-halogenmethoxyanthraquinones. Furthermore 1.4-dihydroxy-, 1.4-aminohydroxy- and 1.4-diaminoanthraquinone or the corresponding leuco compounds can be used, in which case the other nucleus of the anthraquinone molecule may be further substituted as for example by hydroxy groups or halogens. 4-amino-4'-chloro-diphenylether and 4-amino-4'-bromo-diphenylether are suitable 4-amino-4'-halogeno-diphenylethers for use in this connection.

The reaction can be carried out in an excess of the 4-amino-4'-halogeno-diphenylether, in which case the latter acts as a solvent or diluent. The reaction can also be carried out in the presence of a suitable diluent such as butyl alcohol, amyl alcohol, hexaline, methylhexaline or the like.

When using, as starting materials, anthraquinone compounds which have hydroxy or amino groups as the reactive substituents in the 1- and 4-positions, these can be used partly in the form of their leuco compounds which can be added as such or can be produced in the reaction batch from the corresponding unreduced anthraquinone compounds by means of reducing agents such as zinc dust.

The sulphonation is advantageously carried out in sulphuric acid monohydrate, if desired with the addition of oleum or chlorosulphonic acid.

Briefly and more specifically stated, the process of the invention may be characterized as comprising the steps of condensing one mole of an anthraquinone derivative which corresponds to the formula

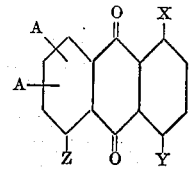

wherein Z stands for hydrogen, chlorine, bromine or nitro, wherein—if Z is hydrogen—X and Y each denotes chlorine, bromine, nitro, amino, hydroxy or methoxy and A stands for hydrogen, chlorine, bromine or hydroxy, and wherein—if Z is chlorine, bromine or nitro—X denotes chlorine, bromine or nitro and each of Y and A is hydrogen, with two moles of 4-amino-4'-chloro-diphenylether or of 4-amino-4'-bromo-diphenylether, and then treating the resultant condensation product with a sulphonating agent. Moreover, the products of the invention may be characterized as corresponding to the formula

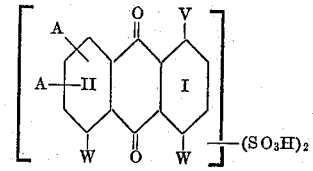

wherein V and one W each denotes either

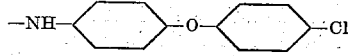

or

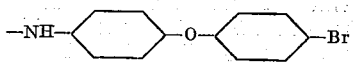

the other W being hydrogen, and wherein—if the W of nucleus I is hydrogen—A stands for hydrogen or—if the W of nucleus II is hydrogen—for hydrogen, chlorine, bromine or hydroxy.

In the following examples, which are illustrative of the invention, the parts denote parts by weight.

Example 1

40 parts of 4-amino-4'-chloro-diphenylether, 5 parts of leuco-1.4-diaminoanthraquinone, 8.5 parts of quinizarine, 2.5 parts of boric acid, 4.3 parts of 33% hydrochloric acid and 33 parts of butyl alcohol are stirred for 15 to 16 hours at 95 to 105° C., whereupon 25 parts of butyl alcohol and 9 parts of concentrated caustic soda lye are added, the product stirred for a further 30 minutes at 90 to 100° C. and then filtered at 70° C. and washed with alcohol warmed to 70° C. until the filtrate is light colored, whereupon it is washed further with hot water. The condensation product thus obtained, viz. 1.4-bis-(4'-(4''-chlorophenoxy)-anilido)-anthraquinone, which forms in the dry state a dark crystalline powder, dissolves in toluene with a blue-green color and in concentrated sulphuric acid with a reddish-blue color.

10 parts of the dried condensation product are dissolved in 5 to 10 times the weight of sulphuric acid monohydrate at 20 to 40° C. until a test sample is completely soluble in water. The sulphonation product is thereupon poured into a mixture of 50 parts of ice, 100 parts of water and 100 parts of 10% common salt solution, filtered and washed thoroughly with a 5% common salt solution. The filter-cake is made into a paste with sodium carbonate until the reaction is neutral and is dried. The dyestuff obtained dyes wool, nylon and loaded and unloaded silk in very fast green shades and has an outstanding power of exhaustion from neutral bath.

Example 2

60 parts of 4-amino-4'-chloro-diphenylether, 4.6 parts of 33% hydrochloric acid, 5.5 parts of leuco-1.4-diaminoanthraquinone, 8.5 parts of quinizarine and 2.5 parts of boric acid are stirred at 95 to 110° C. until the condensation is finished. After the addition of 80 parts of ethyl alcohol and 9 parts of concentrated caustic soda lye, it is stirred for 30 to 60 minutes at 80° C. and is then filtered at 70° C., washed with ethyl alcohol warmed to 70° C. and finally with hot water. The condensation product consisting of 1.4-bis-(4'-(4''-chlorophenoxy)-anilido)-anthraquinone which is obtained in an excellent yield, is dried and dissolved in 5 to 10 times the weight of sulphuric acid monohydrate and warmed to 20 to 50° C. until a test sample is soluble in cold water. The dyestuff worked up as in Example 1 dyes wool, nylon and silk in very fast green shades. It is characterized by an outstanding power of exhaustion from neutral bath.

Instead of leuco-1.4-diaminoanthraquinone and quinizarine, a mixture of leuco-1.4-hydroxyaminoanthraquinone and 1.4-hydroxyaminoanthraquinone can also be used, in which case the same condensation product is obtained.

Example 3

60 parts of 4-amino-4'-chloro-diphenylether, 12 parts of 33% hydrochloric acid, 5.5 parts of leuco-1.4-diaminoanthraquinone, 8.5 parts of 1.4-diaminoanthraquinone and 2.5 parts of boric acid are stirred for 15 to 16 hours at 95 to 110° C., whereupon 80 parts of ethyl alcohol and 10 parts of concentrated caustic soda lye are added and stirred for another hour at 80° C. The product is filtered off at 70° C., washed with hot alcohol and thereupon with hot water and dried. The 1.4-bis-(4'-(4''-chlorophenoxy)-anilido)-anthraquinone thus obtained may be purified by crystallization from organic solvents.

10 parts of the thus-obtained condensation product are dissolved in 5 times the weight of 5% oleum and stirred at 15 to 30° C. until a test sample is completely soluble in water. The dyestuff isolated as in the preceding examples dyes wool, nylon and silk in very fast green shades.

Example 4

60 parts of 4-amino-4'-chlorodiphenylether, 13 parts of quinizarine and 4 parts of 34% hydrochloric acid are stirred at 90 to 95° C. in a nitrogen atmosphere and then 1 part of zinc dust is added little by little during 20 to 40 minutes. After the addition of 2.5 parts of boric acid, the mass is heated for 15 to 16 hours at 95 to 110° C. At a temperature of 90° C., 80 parts of ethyl alcohol and 9 parts of concentrated caustic soda lye are added and stirred for 1 hour at 80° C. The product is filtered off at 70° C., washed with hot alcohol and hot water and the obtained condensation product is dried. The 1.4-bis-(4'-(4''-chlorophenoxy)-anilido)-anthraquinone, thus obtained, may be completely purified by crystallization from organic solvents.

10 parts of the condensation product are stirred in 6 to 8 times the quantity of sulphuric acid monohydrate at 15 to 40° C. until a sample is completely soluble in water. The dyestuff isolated in the usual way dyes wool in fast green shades and has an excellent power of exhaustion from a neutral bath.

The sulphonation can also be carried out with chlorosulphonic acid by introducing 10 parts of the condensation product into a mixture of 50 parts of sulphuric acid monohydrate and 5 parts of chlorosulphonic acid and stirring at 10 to 40° C. until the sulphonation is complete.

Example 5

42 parts of 4-amino-4'-chloro-diphenylether, 13 parts of quinizarine, 30 parts of butyl alcohol and 4.5 parts of 32% hydrochloric acid are stirred in an inert atmosphere at 80 to 90° C., whereupon 1.1 parts of zinc dust are added in small portions during about 20 minutes. After the addition of 2.5 parts of boric acid and 8 parts of butyl alcohol, the mass is stirred for 15 hours at 100 to 110° C. After the addition of 25 parts of butyl alcohol, the mass is stirred at 70° C. for 30 minutes, then filtered, washed with butyl alcohol at 70° C. and finally with hot water.

The condensation product, the 1.4-bis-(4'-(4''-chlorophenoxy)-anilido)-anthraquinone which is obtained in an excellent yield, is dried and then dissolved in 5 to 10 times the weight of sulphuric acid monohydrate and stirred at 20 to 50° C. until a test sample is soluble in water. The dyestuff, worked up as in the preceding examples, dyes wool, nylon and silk in very fast green shades and is characterized by an outstanding power of exhaustion from neutral bath.

Example 6

20 parts of 4-amino-4'-bromo-diphenylether, 25 parts of hexaline, 4 parts of quinizarine, 2 parts of leuco-quinizarine and 1 part of boric acid are stirred at 130 to 160° C. until the condensation is finished. At 90° C., 30 parts of alcohol are added, the product filtered at 70° C. and washed with hot alcohol and finally with hot water. The condensation product obtained, 1.4-bis-(4'-(4''- bromophenoxy)-anilido)-anthraquinone, is dried and can be obtained completely pure in the form of dark violet-red crystals by crystallization from organic solvents, e. g. aniline. It dissolves in toluene with a bluish-green coloration and in concentrated sulphuric acid with a reddish-blue coloration.

10 parts of the condensation product are sulphonated in 5 to 10 times the weight of sulphuric acid monohydrate at 20 to 40° C. and thereupon worked up as in the preceding examples. The dyestuff thus obtained dyes wool, nylon and silk in very fast green shades and has a most excellent power of exhaustion from neutral bath.

The sulphonation can also be performed in 4 to 7% oleum by stirring at room temperature.

*Example 7*

3 parts of leuco-6-chloroquinizarine, 5 parts of 6-chloroquinizarine, 1.5 parts of boric acid, 3.5 parts of glacial acetic acid, 30 parts of 4-amino-4'-chloro-diphenylether and 30 parts of amyl alcohol are stirred at 110 to 130° C. until the condensation progresses no further. Thereupon 20 parts of amyl alcohol and 5 parts of 33% caustic soda lye are added. After stirring for another hour at 90 to 100° C., the condensation product is filtered off at 70° C., washed with amyl alcohol warmed to 70° C. and finally with hot water. The 1.4-bis-(4'-(4''-chlorophenoxy)-anilido)-6-chloranthraquinone thus obtained is a dark crystalline powder which may be completely purified by crystallization from organic solvents. It dissolves in toluene with a green coloration and in concentrated sulphuric acid with a reddish-blue coloration.

10 parts of the dried condensation product are dissolved in 5 to 9 times the quantity of sulphuric acid monohydrate and stirred at 15 to 40° C. until a sample is soluble in water. The dyestuff, isolated as in the preceding examples, dyes wool, silk and nylon in fast green shades.

*Example 8*

50 parts of 4-amino-4'-chloro-diphenylether, 10 parts of 1.4-dichloranthraquinone, 10 parts of potassium acetate and 0.1 part of cuprous chloride are stirred for 5 to 6 hours at 165 to 185° C. At 90° C., 50 parts of ethyl alcohol are added, stirred for some times and filtered at 50° C. After washing with warm alcohol and hot water the condensation product is dried.

The thus-obtained 1.4-bis-(4'-(4''-chlorophenoxy)-anilido)-anthraquinone is a dark crystalline powder which may be completely purified by crystallization from organic solvents. It dissolves in toluene with a green coloration and in concentrated sulphuric acid with a reddish-blue coloration.

10 parts of the dried condensation product are dissolved in 5 to 9 times the quantity of sulphuric acid monohydrate and stirred at 15 to 40° C. until a sample is soluble in water. The dyestuff, isolated as in the preceding examples, dyes wool, silk and nylon in fast green shades.

If instead of 1.4-dichloranthraquinone there is used 1.4-dibromo- or 1-chloro-4-methoxy-anthraquinone or 1-nitro-4-chloranthraquinone, the same condensation product will be obtained.

*Example 9*

50 parts of 4-amino-4'-bromo-diphenylether, 10 parts of 1.5-dichloranthraquinone, 10 parts of potassium acetate and 0.1 part of copper acetate are stirred at 160 to 190° C. until the condensation progresses no further. The condensation product thus formed, viz. 1.5-bis-(4'-(4''-bromophenoxy)-anilido)-anthraquinone, is isolated as in the preceding examples.

10 parts of the dried condensation product is stirred in 5 to 8 times the weight of sulphuric acid monohydrate at 20 to 50° C. until a sample is soluble in water. The dyestuff is separated by pouring into a 5% common salt solution, filtered and washed a few times with a 5% common salt solution. The filter-cake is made into a paste with sodium carbonate until weakly alkaline and dried. The dyestuff which possesses an excellent power of exhaustion from neutral bath dyes wool, nylon and silk in very fast red-violet shades.

*Example 10*

50 parts of 4-amino-4'-chloro-diphenylether, 10 parts of 1.8-dichloranthraquinone, 10 parts of potassium acetate and 0.1 part of cuprous chloride are stirred for 5 to 6 hours at 165 to 175° C. At 90° C., 50 parts of ethyl alcohol are added, stirred for some time and filtered at 50° C. After washing with warm alcohol and hot water, the condensation product is dried. The 1.8-bis-(4'-(4''-chlorophenoxy)-anilido)-anthraquinone thus obtained in excellent yield is a dark violet-red crystalline powder which dissolves in toluene with a violet-red coloration and in concentrated sulphuric acid with a pale brownish-yellow coloration.

10 parts of the condensation product are dissolved in 7 to 8 times the weight of sulphuric acid monohydrate and stirred at 20 to 40° C. until a sample is soluble in water. The dyestuff isolated as in the preceding examples forms, after drying, a dark powder and dyes wool, nylon, and loaded and unloaded silk in violet shades which are bluer than those of the 1.5-derivative.

Instead of 1.8-dichloranthraquinone, 1.8-dibromanthraquinone can also be used, in which case the same condensation product is obtained.

*Example 11*

5 parts of 1.5-dinitroanthraquinone are stirred in 6 times the quantity of 4-amino-4'-chloro-diphenylether at 175 to 185° C. until the condensation no longer progresses. It is treated with 30 parts of ethanol at 90° C., filtered at 50° C., washed with warm alcohol and finally with hot water. The condensation product may be purified by crystallization from an organic solvent such as aniline, and is 1.5-bis-(4'-4''-chlorophenoxy)-anilido)-anthraquinone.

10 parts of the condensation product are dissolved in 5 to 10 times the weight of sulphuric acid monohydrate and stirred at room temperature until a sample is completely soluble in water. The dyestuff, worked up as in the preceding examples, dyes wool, nylon and silk in fast red-violet shades.

*Example 12*

5 parts of 1.5-chloronitroanthraquinone, 3 parts of potassium acetate and 40 parts of 4-amino-4'-chloro-diphenyl ether are heated at 170 to 180° C. until the condensation progresses no further. 40 parts of ethyl alcohol are added at 90° C. and the condensation product is separated by filtration and washing with alcohol and water and then dried. It is 1.5-bis-(4'-(4''-chlorophenoxy)-anilido)-anthraquinone.

5 parts of the condensation product are dissolved in 4 to 5 times the quantity of sulphuric acid monohydrate, treated with 8 parts of 28% oleum and stirred at room temperature until a sample is completely soluble in water. The dyestuff obtained dyes wool, nylon and silk in very fast red-violet shades.

Example 13

50 parts of 4-amino-4'-chloro-diphenylether, 10 parts of 1.5-dichloranthraquinone, 10 parts of potassium acetate and 0.1 part of cuprous chloride are stirred at 170 to 180° C. until the condensation is finished. Then 50 parts of ethyl or propyl alcohol are added at 90° C., filtered at 70° C., washed first with hot alcohol and finally with hot water. The dried condensation product, the 1.5-bis-(4'-(4''-chlorphenoxy)-anilido)-anthraquinone, is a dark brown-violet crystalline powder which dissolves in benzene with a violet-red coloration and in concentrated sulphuric acid with a pale olive coloration.

10 parts of the condensation product are dissolved in 8 times the weight of sulphuric acid monohydrate and stirred at 20 to 30° C. until a sample is soluble in water. The dyestuff separated in the usual way forms a dark powder after drying and dyes wool, nylon and silk in very fast red-violet shades.

Example 14

60 parts of 4-amino-4'-chloro-diphenylether, 10 parts of 1.5-dichloranthraquinone and 6 parts of potassium acetate are stirred for 6 hours at 180 to 190° C. At 90° C., 50 parts of ethanol are added. The separated condensation product is filtered off at 50° C., washed with 70° C. warm alcohol and finally with hot water and dried. The 1.5-bis-(4'-(4''-chlorophenoxy)-anilido)-anthraquinone, which is obtained in excellent yield, is stirred in 8 to 9 times the quantity of sulphuric acid monohydrate at room temperature until a sample is completely soluble in water. The dyestuff formed is isolated as in the preceding examples and dyes wool, nylon and silk in very fast red-violet shades and has an outstanding power of exhaustion from neutral baths.

Instead of the sulphuric acid monohydrate the same quantity of 5% oleum can be used for sulphonation, in which case this can be carried out at 15 to 30° C.

Example 15

3.6 parts of leuco-6.7-dichloro-quinizarine, 5 parts of 6.7-dichloroquinizarine, 2 parts of boric acid, 30 parts of 4-amino-4'-chloro-diphenylether, 4 parts of glacial acetic acid and 35 parts of amyl alcohol are stirred at 125 to 135° C. until the condensation progresses no further. The product is treated with 30 parts of amyl alcohol and filtered at 50 to 70° C. The condensation product is washed with warm amyl alcohol and finally with hot water. After drying, the resultant 1.4-bis-(4'-(4''-chlorophenoxy)-anilido)-6.7-dichloranthraquinone can be obtained in a completely pure state by crystallization from an organic solvent, as for example aniline. It dissolves in hot tolune with a bluish-green color and in concentrated sulphuric acid with a reddish-blue color.

10 parts of the condensation product are dissolved in 7 to 8 times the weight of 5% oleum and stirred at 20 to 50° C. until a sample is completely soluble in water. The dyestuff, isolated as in the preceding examples, dyes wool in green shades.

Example 16

75 parts of 4-amino-4'-chloro-diphenylether, 8 parts of 33% hydrochloric acid and 4.8 parts of 1.4.5.6-tetrahydroxyanthraquinone are stirred at 85 to 90° C. in an inert atmosphere while 2 parts of zinc dust are introduced in about 30 minutes. After the addition of 7.2 parts of 1.4.5.6-tetrahydroxyanthraquinone and 4.5 parts of boric acid, the mass is heated for 16 hours at 100 to 110° C., then 70 parts of butyl alcohol are added and for one hour air is blown over the surface of the condensation product at 90° C. It is filtered off at 70° C., washed with hot butyl alcohol and finally with hot water. The condensation product, the 1.4-bis-(4'-(4''-chlorophenoxy)-anilido)-5.6-dihydroxyanthraquinone, may be purified by crystallization from aniline and alcohol. It is a dark powder which dissolves in hot toluene with a green coloration and in concentrated sulphuric acid with a reddish-blue coloration.

10 parts of the condensation product are dissolved in 8 times the weight of sulphuric acid monohydrate and stirred at 20 to 30° C. until a sample is completely soluble in water. The dyestuff, separated as in the preceding examples, dyes wool in green shades and yields green chrome printings on cotton.

Example 17

10 parts of the technical mixture of 1.5- and 1.8-dichloranthraquinones, 0.1 part of cuprous chloride, 60 parts of 4-amino-4'-chloro-diphenylether and 10 parts of potassium acetate are stirred for 6 hours at 165 to 180° C. 50 parts of alcohol are added at 90° C. and the separated condensation product is filtered off at 50 to 60° C., washed with warm alcohol and finally with hot water. After drying, 10 parts of the condensation product are stirred in 8 to 9 times the weight of sulphuric acid monohydrate at room temperature until a sample is completely soluble in water. The dyestuff is separated by pouring the sulphonation product into 800 parts of a 6% common salt solution, filtered off and washed a few times with a 6% common salt solution. The filter-cake is made into a paste with sodium carbonate until weakly alkaline and dried. The dyestuff thus obtained dyes wool, nylon and silk in violet shades.

Having thus disclosed the invention, what is claimed is:

1. A process for the manufacture of a dyestuff of the anthraquinone series comprising the steps of condensing one mole of an anthraquinone derivative corresponding to the formula:

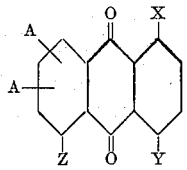

wherein Z stands for a member selected from the group consisting of hydrogen, chlorine, bromine and nitro, wherein—if Z is hydrogen—X and Y each denotes a member chosen from the group consisting of chlorine, bromine, nitro, amino, hydroxy and methoxy, and A stands for a member selected from the group consisting of hydrogen, chlorine, bromine and hydroxy, and wherein —if Z stands for chlorine, bromine or nitro— X denotes a member selected from the group consisting of chlorine, bromine and nitro, and each of Y and A is hydrogen, with two molecules of a 4-amino-4'-halogeno-diphenylether, wherein the halogen is an atom selected from the group consisting of chlorine and bromine, and treating the condensation product with a sulphonating agent.

2. A process for the manufacture of a new dyestuff of the anthraquinone series comprising the step of condensing one molecule of an anthraquinone derivative corresponding to the formula

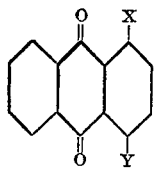

wherein X and Y each denotes a member selected from the group consisting of chlorine, bromine, nitro, amino, hydroxy and methoxy, with two molecules of 4 - amino-4'-chlorodiphenylether, and sulphonating the condensation product with sulphuric acid monohydrate.

3. A process for the manufacture of a new dyestuff of the anthraquinone series comprising the step of condensing one molecule of an anthraquinone derivative corresponding to the formula

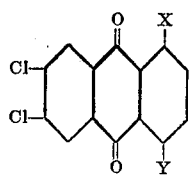

wherein X and Y each denotes a member selected from the group consisting of chlorine, bromine, nitro, amino, hydroxy and methoxy, with two molecules of 4 - amino-4'-chloro-diphenylether, and sulphonating the condensation product with chlorosulphonic acid.

4. A process for the manufacture of a new dyestuff of the anthraquinone series comprising the step of condensing one molecule of an anthraquinone derivative corresponding to the formula

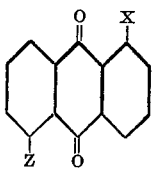

wherein X and Z each denotes a member selected from the group consisting of chlorine, bromine and nitro, with two molecules of 4-amino-4'-chloro-diphenylether, and sulphonating the condensation product with fuming sulphuric acid.

5. An anthraquinone dyestuff which corresponds to the formula

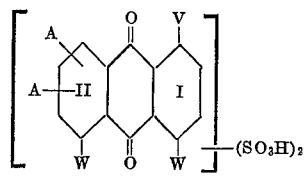

wherein V and one W each denotes a member selected from the group consisting of

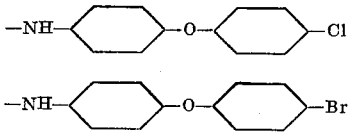

and the other W being hydrogen, and wherein A stands—in the case of W of nucleus I being hydrogen and—in the case of W of nucleus II being hydrogen—for a member chosen from the group consisting of hydrogen, chlorine, bromine and hydroxy.

6. The anthraquinone dyestuff of the formula

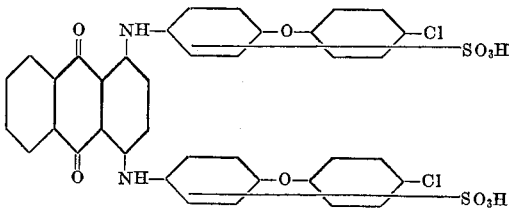

7. The anthraquinone dyestuff of the formula

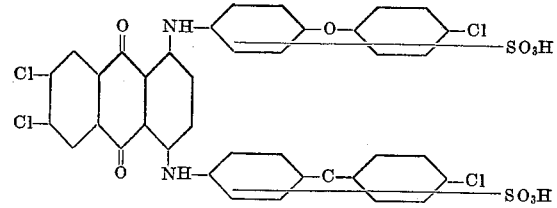

8. The anthraquinone dyestuff of the formula

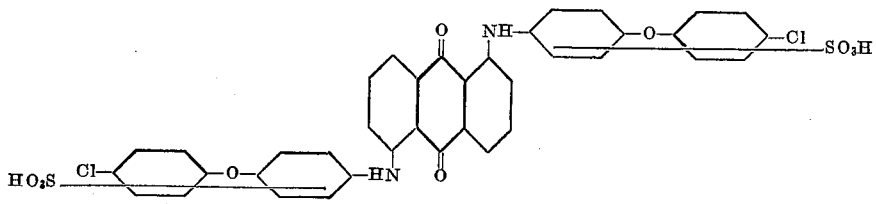

SAMUEL VON ALLMEN.
ERNST GUTZWILLER.
JACQUES GÜNTHART.

REFERENCES CITED

The following references are of record in the file of this patent:

UNITED STATES PATENTS

| Number | Name | Date |
| --- | --- | --- |
| 2,158,473 | Mettler | May 16, 1939 |
| 2,412,790 | Allmen et al. | Dec. 17, 1946 |

FOREIGN PATENTS

| Number | Country | Date |
| --- | --- | --- |
| 248,874 | Great Britain | Sept. 1925 |
| 449,012 | Great Britain | June 15, 1936 |
| 219,865 | Switzerland | June 1942 |
| 880,630 | France | Mar. 3, 1943 |

Certificate of Correction

Patent No. 2,559,330                                                  July 3, 1951

SAMUEL von ALLMEN ET AL.

It is hereby certified that error appears in the printed specification of the above numbered patent requiring correction as follows:

Column 1, line 39, for "nitrocloranthraquinones" read *nitrochloranthraquinones*; column 5, line 50, for "times" read *time*; column 7, line 64, for "tolune" read *toluene*; column 10, line 21, before "and" insert —*for hydrogen*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*